(12) United States Patent
Waldrep et al.

(10) Patent No.: US 10,896,208 B1
(45) Date of Patent: Jan. 19, 2021

(54) MAPPING CONTENT DELIVERY

(71) Applicant: Palantir Technologies Inc., Palo Alto, CA (US)

(72) Inventors: William Waldrep, Palo Alto, CA (US); John Carrino, Redwood City, CA (US); Peter Wilczynski, San Francisco, CA (US); Daniel Paquette, Ashburn, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 752 days.

(21) Appl. No.: 15/658,054

(22) Filed: Jul. 24, 2017

Related U.S. Application Data (60) Provisional application No. 62/369,977, filed on Aug. 2, 2016.

(51) Int. Cl.
*G06F 16/29* (2019.01)
*G01C 21/32* (2006.01)
*G06F 16/44* (2019.01)

(52) U.S. Cl.
CPC ............. *G06F 16/29* (2019.01); *G01C 21/32* (2013.01); *G06F 16/444* (2019.01)

(58) Field of Classification Search
None
See application file for complete search history.

(56) References Cited

U.S. PATENT DOCUMENTS

| | | | |
|---|---|---|---|
| 4,899,161 A | 2/1990 | Morin, Jr. et al. | |
| 4,958,305 A | 9/1990 | Piazza | |
| 5,329,108 A | 7/1994 | Lamoure | |
| 5,754,182 A | 5/1998 | Kobayashi | |
| 5,781,195 A | 7/1998 | Marvin | |
| 5,781,704 A | 7/1998 | Rossmo | |
| 6,073,076 A | 6/2000 | Crowley et al. | |
| 6,091,956 A | 7/2000 | Hollenberg | |
| 6,157,747 A | 12/2000 | Szeliski et al. | |
| 6,169,552 B1 | 1/2001 | Endo et al. | |
| 6,173,067 B1 | 1/2001 | Payton et al. | |

(Continued)

FOREIGN PATENT DOCUMENTS

| | | |
|---|---|---|
| AU | 2012216622 | 5/2015 |
| DE | 102013222023 A1 | 1/2015 |

(Continued)

OTHER PUBLICATIONS

"A First Look: Predicting Market Demand for Food Retails using a Huff Analysis", TRF Policy Solutions, CDFI Fund, Capacity Building Initiative, (Jul. 2012), 1-30.

(Continued)

*Primary Examiner* — Christopher J Raab (74) *Attorney, Agent, or Firm* — Schwegman Lundberg & Woessner, P.A.

(57) ABSTRACT

Aspects of the present disclosure relate to mapping content delivery. A client device provides, to a map management server, a request for a map of a geographic region. The client device receives, from the map management server, an identification of tiles for the map. The client device provides, to a first tile server, a request for the tiles for the map. In response to receiving the tiles from the first tile server: the client device displays the map of the geographic region based on the tiles.

20 Claims, 4 Drawing Sheets

(56) References Cited

U.S. PATENT DOCUMENTS

| | | |
|---|---|---|
| 6,178,432 B1 | 1/2001 | Cook et al. |
| 6,247,019 B1 | 6/2001 | Davies |
| 6,370,539 B1 | 4/2002 | Ashby et al. |
| 6,389,289 B1 | 5/2002 | Voce |
| 6,414,683 B1 | 7/2002 | Gueziec |
| 6,483,509 B1 | 11/2002 | Rabenhorst |
| 6,529,900 B1 | 3/2003 | Patterson et al. |
| 6,631,496 B1 | 10/2003 | Li et al. |
| 6,662,103 B1 | 12/2003 | Skolnick et al. |
| 6,757,445 B1 | 6/2004 | Knopp |
| 6,828,920 B2 | 12/2004 | Owen et al. |
| 6,983,203 B1 | 1/2006 | Wako |
| 6,985,950 B1 | 1/2006 | Hanson et al. |
| 7,036,085 B2 | 4/2006 | Barros |
| 7,158,878 B2 | 1/2007 | Rasmussen |
| 7,375,732 B2 | 5/2008 | Arcas |
| 7,379,811 B2 | 5/2008 | Rasmussen et al. |
| 7,457,706 B2 | 11/2008 | Melero |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,617,314 B1 | 11/2009 | Bansod |
| 7,620,628 B2 | 11/2009 | Kapur et al. |
| 7,663,621 B1 | 2/2010 | Allen |
| 7,791,616 B2 | 9/2010 | Loup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,920,963 B2 | 4/2011 | Jouline et al. |
| 7,945,852 B1 | 5/2011 | Pilskains |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,065,080 B2 | 11/2011 | Koch |
| 8,085,268 B2 | 12/2011 | Carrino et al. |
| 8,103,441 B2 | 1/2012 | Callaghan et al. |
| 8,134,457 B2 | 3/2012 | Velipasalar et al. |
| 8,145,703 B2 | 3/2012 | Frishert et al. |
| 8,200,676 B2 | 6/2012 | Frank |
| 8,214,361 B1 | 7/2012 | Sandler et al. |
| 8,214,764 B2 | 7/2012 | Gemmell et al. |
| 8,219,684 B1 | 7/2012 | Dean |
| 8,229,947 B2 | 7/2012 | Fujinaga |
| 8,230,333 B2 | 7/2012 | Decherd et al. |
| 8,290,942 B2 | 10/2012 | Jones et al. |
| 8,290,943 B2 | 10/2012 | Carbone et al. |
| 8,301,464 B2 | 10/2012 | Cave et al. |
| 8,325,178 B1 | 12/2012 | Doyle et al. |
| 8,368,695 B2 | 2/2013 | Howell et al. |
| 8,397,171 B2 | 3/2013 | Klassen et al. |
| 8,400,448 B1 | 3/2013 | Doyle |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,742,934 B1 | 6/2014 | Sarpy, Sr. et al. |
| 8,774,470 B1 | 7/2014 | Schmidt et al. |
| 8,781,169 B2 | 7/2014 | Jackson et al. |
| 8,799,799 B1 | 8/2014 | Cervelli et al. |
| 8,830,322 B2 | 9/2014 | Nerayoff et al. |
| 8,938,686 B1 | 1/2015 | Erenrich et al. |
| 8,949,164 B1 | 2/2015 | Mohler |
| 8,971,928 B2 | 3/2015 | Barnes |
| 8,983,494 B1 | 3/2015 | Onnen et al. |
| 9,009,177 B2 | 4/2015 | Zheng et al. |
| 9,021,384 B1 | 4/2015 | Beard et al. |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,129,219 B1 | 9/2015 | Robertson et al. |
| 9,146,125 B2 | 9/2015 | Vulcano et al. |
| 9,201,898 B2 | 12/2015 | Chawathe et al. |
| 9,280,618 B1 | 3/2016 | Bruce et al. |
| 9,396,508 B2 | 7/2016 | Otero et al. |
| 9,424,673 B2 | 8/2016 | Otero et al. |
| 9,674,278 B1 | 6/2017 | Hong |
| 9,686,357 B1 | 6/2017 | Waldrep et al. |
| 2002/0003539 A1 | 1/2002 | Abe |
| 2002/0033848 A1 | 3/2002 | Sciammarella et al. |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2003/0052896 A1 | 3/2003 | Higgins et al. |
| 2003/0084076 A1 | 5/2003 | Sekiguchi et al. |
| 2003/0103049 A1 | 6/2003 | Kindratenko et al. |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2004/0030492 A1 | 2/2004 | Fox et al. |
| 2004/0039498 A1 | 2/2004 | Ollis et al. |
| 2004/0098236 A1 | 5/2004 | Mayer et al. |
| 2004/0143602 A1 | 7/2004 | Ruiz et al. |
| 2005/0031197 A1 | 2/2005 | Knopp |
| 2005/0034062 A1 | 2/2005 | Bufkin et al. |
| 2005/0080769 A1 | 4/2005 | Gemmell et al. |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0223044 A1 | 10/2005 | Ashworth et al. |
| 2005/0267652 A1 | 12/2005 | Allstadt et al. |
| 2006/0026170 A1 | 2/2006 | Kreitler et al. |
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott, IV et al. |
| 2007/0115373 A1 | 5/2007 | Gallagher et al. |
| 2007/0188516 A1 | 8/2007 | Loup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0294643 A1 | 12/2007 | Kyle |
| 2008/0010605 A1 | 1/2008 | Frank |
| 2008/0040684 A1 | 2/2008 | Crump et al. |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0192053 A1 | 8/2008 | Howell |
| 2008/0195417 A1 | 8/2008 | Surpin |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao et al. |
| 2008/0278311 A1 | 11/2008 | Grange et al. |
| 2008/0288306 A1 | 11/2008 | MacIntyre et al. |
| 2008/0294678 A1 | 11/2008 | Gorman et al. |

(56) References Cited

U.S. PATENT DOCUMENTS

| | | |
|---|---|---|
| 2008/0301643 A1 | 12/2008 | Appleton et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shimasaki et al. |
| 2009/0132921 A1 | 5/2009 | Hwangbo et al. |
| 2009/0132953 A1 | 5/2009 | Reed, Jr. et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett |
| 2010/0321399 A1 | 12/2010 | Ellren et al. |
| 2011/0022312 A1 | 1/2011 | McDonough et al. |
| 2011/0055290 A1* | 3/2011 | Li .................... G06F 16/29 707/807 |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0173606 A1 | 7/2012 | Becker |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0132398 A1 | 5/2013 | Pfeifle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg |
| 2014/0149372 A1* | 5/2014 | Sankar .................. G06F 16/9535 707/706 |
| 2014/0176606 A1 | 6/2014 | Narayan et al. |
| 2014/0213298 A1 | 7/2014 | Marti et al. |
| 2014/0218400 A1 | 8/2014 | O'Toole et al. |
| 2014/0333651 A1 | 11/2014 | Cervelli et al. |
| 2014/0337772 A1 | 11/2014 | Cervelli et al. |
| 2014/0344296 A1* | 11/2014 | Chawathe .......... G06F 16/9574 707/755 |
| 2014/0361899 A1 | 12/2014 | Layson |
| 2015/0029176 A1 | 1/2015 | Baxter |
| 2015/0100907 A1 | 4/2015 | Erenrich et al. |
| 2015/0106170 A1 | 4/2015 | Bonica |
| 2015/0186443 A1 | 7/2015 | Ito et al. |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0227553 A1* | 8/2015 | Dobre ................. G06F 16/2255 707/793 |
| 2015/0312323 A1 | 10/2015 | Peterson |
| 2015/0338233 A1 | 11/2015 | Cervelli et al. |
| 2015/0379413 A1 | 12/2015 | Robertson et al. |
| 2017/0011064 A1* | 1/2017 | Mercer .................. G06F 16/29 |

FOREIGN PATENT DOCUMENTS

| | | |
|---|---|---|
| EP | 0763201 A1 | 3/1997 |
| EP | 2858014 A2 | 4/2015 |
| EP | 2963595 A1 | 1/2016 |
| GB | 2516155 A | 1/2015 |
| NL | 2012778 A | 11/2014 |
| NZ | 624557 A | 8/2014 |
| WO | WO-9532424 A1 | 11/1995 |
| WO | WO-2000009529 A2 | 2/2000 |
| WO | WO-2001098925 A2 | 12/2001 |
| WO | WO-2004057268 A2 | 7/2004 |
| WO | WO-2005013200 A1 | 2/2005 |
| WO | WO-2008064207 A2 | 5/2008 |
| WO | WO-2009061501 A1 | 5/2009 |
| WO | WO-2009123975 A1 | 10/2009 |
| WO | WO-2011058507 A1 | 5/2011 |

OTHER PUBLICATIONS

"Amm's Diary: Unconnected ways and other data quality issues", Open Street Map, [Online]. Retrieved from the Internet: <URL: http://www.openstreetmap.org/user/amm/diary>, (Accessed: Jul. 23, 2012), 3 pgs.

"U.S. Appl. No. 12/840,673, Final Office Action dated Jan. 2, 2015", 21 pgs.

"U.S. Appl. No. 12/840,673, Non Final Office Action dated Sep. 17, 2014", 21 pgs.

"U.S. Appl. No. 12/840,673, Notice of Allowance dated Apr. 6, 2015", 11 pgs.

"U.S. Appl. No. 13/728,879, Final Office Action dated Aug. 12, 2015", 9 pgs.

"U.S. Appl. No. 13/728,879, First Action Interview Office Action Summary dated Mar. 17, 2015", 5 pgs.

"U.S. Appl. No. 13/728,879, First Action Interview Pre-Interview Communication dated Jan. 27, 2015", 4 pgs.

"U.S. Appl. No. 13/917,571, Issue Notification dated Aug. 5, 2014", 1 pg.

"U.S. Appl. No. 13/948,859, Notice of Allowance dated Dec. 10, 2014", 8 pgs.

"U.S. Appl. No. 14/289,596, Advisory Action dated Apr. 30, 2015", 3 pgs.

"U.S. Appl. No. 14/289,596, Final Office Action dated Jan. 26, 2015", 38 pgs.

"U.S. Appl. No. 14/289,596, First Action Interview Pre-Interview Communication dated Jul. 18, 2014", 4 pgs.

"U.S. Appl. No. 14/289,596, Non Final Office Action dated May 9, 2016", 37 pgs.

"U.S. Appl. No. 14/289,599, Advisory Action dated Sep. 4, 2015", 24 pgs.

"U.S. Appl. No. 14/289,599, Final Office Action dated May 29, 2015", 8 pgs.

"U.S. Appl. No. 14/289,599, First Action Interview Pre-Interview Communication dated Jul. 22, 2014", 5 pgs.

(56) References Cited

OTHER PUBLICATIONS

"U.S. Appl. No. 14/294,098, Final Office Action dated Nov. 6, 2014", 22 pgs.
"U.S. Appl. No. 14/294,098, First Action Interview Pre-Interview Communication dated Aug. 15, 2014", 17 pgs.
"U.S. Appl. No. 14/294,098, Notice of Allowance dated Dec. 29, 2014", 9 pgs.
"U.S. Appl. No. 14/319,161, Final Office Action dated Jan. 23, 2015", 21 pgs.
"U.S. Appl. No. 14/319,161, Notice of Allowance dated May 4, 2015", 6 pgs.
"U.S. Appl. No. 14/490,612, Final Office Action dated Aug. 18, 2015", 71 pgs.
"U.S. Appl. No. 14/730,123, Notice of Allowance dated Apr. 12, 2016", 10 pgs.
"U.S. Appl. No. 14/730,123, Pre-Interview First Office Action dated Sep. 21, 2015", 4 pgs.
"U.S. Appl. No. 14/929,584, Final Office Action dated May 25, 2016", 42 pgs.
"U.S. Appl. No. 14/929,584, Non Final Office Action dated Feb. 4, 2016", 15 pgs.
"U.S. Appl. No. 14/934,004, First Action Interview Pre-Interview Communication dated Feb. 16, 2016", 5 pgs.
"U.S. Appl. No. 15/273,480, Notice of Allowance dated Jan. 31, 2017", 9 pgs.
"U.S. Appl. No. 15/349,794, Notice of Allowance dated Feb. 17, 2017", 16 pgs.
"Australian Application Serial No. 2012216622, Office Action dated Jan. 6, 2015", 2 pgs.
"Australian Application Serial No. 2014202442, Office Action dated Mar. 19, 2015", 5 pgs.
"Australian Application Serial No. 2014213553, Office Action dated May 7, 2015", 2 pgs.
"Buffer a Polygon", VBForums, [Online]. Retrieved from the Internet: <URL: http://www.vbforums.com/showthread.php?198436-Buffer-a-Polygon>, (Accessed: Oct. 10, 2016).
"Douglas-Peucker-Algorithms", Wikipedia (W/ Machine Translation), [Online]. [Archived Jul. 29, 2011]. Retrieved from the Internet: <URL: http://de.wikipedia.org/w/index.php?title=Douglas-Peucker-Algorithmus&oldid=91846042">, (Last Modified: Jul. 29, 2011), 4 pgs.
"European Application Serial No. 14187739.9, Extended European Search Report dated Jul. 6, 2015", 9 pgs.
"European Application Serial No. 17184558.9, Extended European Search Report dated Nov. 8, 2017", 8 pgs.
"GIS-NET 3 Public Department of Regional Planning", Planning & Zoning Information for Unincorporated LA County, [Online] Retrieved from the internet: <http://gis.planning.lacounty.gov/GIS-NET3_Public/Viewer.html>, (Oct. 2, 2013), 1-2.
"Great Britain Application Serial No. 1408025.3, Office Action dated Nov. 6, 2014", 3 pgs.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"Identify—Definition", Downloaded Jan. 22, 2015, (Jan. 22, 2015), 1 pg.
"Map Builder: Rapid Mashup Development Tool for Google and Yahoo Maps!", http://web.archive.org/web/20090626224734/http://www.mapbuilder.net/, (Jul. 20, 2012), 2 pgs.
"Map of San Jose, CA", Google, [Online] retrieved from the internet: <http://maps.google.com>, (Oct. 2, 2013), 1 pg.
"Map of San Jose, CA", Yahoo, [Online] retrieved from the internet: <http://maps.yahoo.com>, (Oct. 2, 2013), 1 pg.
"Map of San Jose, CA.", Retrieved Oct. 2, 2013 from http://maps.bing.com, (Oct. 2, 2013), 1 pg.
"Netherlands Application Serial No. 2011632, Netherlands Search Report dated Feb. 8, 2016", W/ English Translation, 9 pgs.
"Netherlands Application Serial No. 2012778, Netherlands Search Report dated Sep. 22, 2015", W/ English Translation, 10 pgs.

"New Zealand Application Serial No. 628585, Office Action dated Aug. 26, 2014", 2 pgs.
"New Zealand Application Serial No. 628840, Office Action dated Aug. 28, 2014", 2 pgs.
"Overlay—Definition", Downloaded Jan. 22, 2015, (Jan. 22, 2015), 1 pg.
"Ramer-Douglas-Peucker algorithm", Wikipedia, [Online]. [Archived May 31, 2015]. Retrieved from the Internet: <URL: http://en.wikipedia.orglw/indexphp?title=Ramer-DouglasPeucker_algorithm&oldid=557739119">, (Jul. 2011), 3 pgs.
"Using the Area of Interest Tools", Sonris, [Online]. Retrieved from the Internet: <URL: http://web.archive.org/web/20061001053327/http://sonris-www.dnr.state.la.us/gis/instruct_files/tutslide12.htm>, (Oct. 1, 2006), 1 pg.
Aquino, J., et al., "JTS Topology Suite: Technical Specifications", Vivid Solutions, Technical Specifications Version 1.4, (Oct. 17, 2003), 1-36.
Barnes, Diane, et al., "Viewshed Analysis", GIS—ARC/INFO, (2001), 1-10.
Barto, "How to: Create Your Own Points of Interest", How to, [Online]. Retrieved from the Internet: <URL:http://www.poieditor.com/articles/how to_create_your_own_points_of_interest/>, (Jul. 22, 2008), 4 pgs.
Carver, Steve, et al., "Real-time visibility analysis and rapid viewshed calculation using a voxel-based modelling approach", (Apr. 13, 2012), 6 pgs.
Chen, et al., "Bringing Order to the Web: Automatically Categorizing Search Results", Proceedings of the SIGCHI conference on Human Factors in Computing Systems, The Haque, The Netherlands, (2000), 145-152.
Dramowicz, Ela, "Retail Trade Area Analysis Using the Huff Model", Directions Magazine,, [Online] retrieved from the internet: <http://www.directionsmag.com/articles/retail-trade-area-analysis-using-the-huff-model/123411>, (Jul. 2, 2005), 10 pgs.
Ghosh, Pijush K, "A Solution of Polygon Containment, Spatial Planning, and Other Related Problems Using Minkowski Operations", National Centre for Software Technology, Bombay India, Computer Vision, Graphics, and Image Processing, vol. 49, (Feb. 15, 1989), 35 pgs.
Gorr, et al., "Crime Hot Spot Forecasting: Modeling and Comparative Evaluation", Grant 98-IJ-CX-K005, (May 6, 2002), 37 pgs.
Griffith, Daniel A, et al., "A Generalized Huff Model", Geographical Analysis, vol. 14, No. 2, (Apr. 1982), 135-144.
Haralick, Robert M, et al., "Image Analysis Using Mathematical Morphology", IEE Transactions on pattern analysis and machine intelligence, vol. PAMI-9, (Jul. 4, 1987), 532-550.
Hibbert, et al., "Prediction of Shopping Behavior Using a Huff Model Within a GIS Framework", (Mar. 18, 2011), 16 pgs.
Huang, Da Wei, et al., "Systematic and Integrative Analysis of Large Gene Lists Using DAVID Bioinformatics Resources", Nature Protocols, 4.1, (Dec. 2008), 44-57.
Huff, et al., "Calibrating the Huff Model Using ArcGIS Business Analyst", ESRI, (Sep. 2008), 33 pgs.
Huff, David L, "Parameter Estimation in the Huff Model", ESRI, ArcUser, (2003), 34-36.
Ipbucker, C, et al., "Inverse Transformation for Several Pseudocylindrical Map Projections Using Jacobian Matrix", ICCSA 2009, Part 1 LNCS 5592, (2009), 2 pgs.
Levine, Ned, "Crime Mapping and the Crimestat Program", Geographical Analysis, vol. 38, (2006), 41-56.
Liu, T., "Combining GIS and the Huff Model to Analyze Suitable Locations for a New Asian Supermarket in the Minneapolis and St. Paul, Minnesota USA", Papers in Resource Analysis, 2012, vol. 14, (2012), 8 pgs.
Mandagere, Nagapramod, "Buffer Operations in GIS", [Online]. Retrieved from the Internet: <URL: http://www-users.cs.umn.edu/~npramod/enc_pdf.pdf>, (Printed: Jan. 20, 2010), 7 pgs.
Murray, C, "Oracle Spatial Developer's Guide-6 Coordinate Systems ( Spatial Reference Systems)", [Online]. Retrieved from the (56) References Cited

OTHER PUBLICATIONS

Internet<URL:http://docs.oracle.com/cd/B28359_01/appdev.111/b28400.pdf>, (Jun. 2009), 870 pgs.

Pozzi, F., et al., "Vegetation and Population Density in Urban and Suburban Areas in the USA", Presented at the Third International Symposium of Remote Sensing of Urban Areas; Istanbul, Turkey, Jun. 2002, (Jun. 2002), 8 pgs.

Qiu, Fang, "3D Analysis and Surface Modeling", Power point presentation, 26 pgs.

Reddy, Martin, et al., "Under the Hood of GeoVRML 1.0", Proceeding VRML '00 Proceedings of the fifth symposium on Virtual reality modeling language (Web3D-VRML), [Online] Retrieved from the internet: <http://pdf.aminer.org/000/648/038/under_the_hood_of_geovrml.pdf>, (Feb. 2000), 23-28.

Reibel, M., et al., "Areal Interpolation of Population Counts Using Pre-classified Land Cover Data", Popul Res Policy Rev. 26, (Sep. 19, 2007), 619-633.

Reibel, M., et al., "Geographic Information Systems and Spatial Data Processing in Demography: a Review", Popul Res Policy Rev (2007) 26, (Sep. 6, 2007), 601-618.

Rizzardi, M., et al., "Interfacing U.S. Census Map Files With Statistical Graphics Software: Application and Use in Epidemiology", Statistics in Medicine, vol. 12, (1993), 1953-1964.

Snyder, John P, "Map Projections—A Working Manual", U.S. Geological Survey Professional Paper, 1395, (1987), 29 pgs.

Tangelder, J W.H, et al., "Freeform Shape Matching Using Minkowski Operations", (Jun. 1996), 12 pgs.

Thompson, Mick, "Getting Started with GEO", (Jul. 26, 2011), 3 pgs.

Turner, Andy, "Andy Turner's GISRUK 2012 Notes", Google Drive—https://docs.google.com/document/d/1cTmxg7mVx5gd89lqblCYvDEnHA4QAivH417WpyPsqE4edit?pli=1, (Sep. 16, 2013), 1-15.

Valentini, Giorgio, et al., "Ensembles of Learning Machines", Lecture Notes in Computer Science: Neural Nets, Springer Berlin Heidelberg, (Sep. 26, 2002), 3-20.

Wongsuphasawat, Krist, et al., "Visual Analytics for Transportation Incident Data Sets", Transportation Research Record: Journal of the Transportation Research Board, No. 2138, (2009), 135-145.

Woodbridge, Stephen, "[geos-devel] Polygon simplification", [Online]. Retrieved from the Internet:<URL:http://lists.osgeo.org/pipermail/geos-devel/2011-May/005210.html>, (May 8, 2011), 2 pgs.

\* cited by examiner

MAPPING CONTENT DELIVERY

PRIORITY CLAIM

This application claims priority to U.S. Provisional Patent Application No. 62/369,977, filed on Aug. 2, 2016, entitled "MAPPING CONTENT DELIVERY," the entire content of which is incorporated herein by reference.

TECHNICAL FIELD

The subject matter disclosed herein relates to content delivery to a client device. In particular, example embodiments may relate to delivering, to a client device, a map requested at the client device.

BACKGROUND

A mapping application of a client device may access maps based on tiles that are stored on several different tile servers. One challenge is selecting an appropriate tile server to use to generate a requested map, as the tiles for the map may be stored at multiple different tile servers.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As noted above, a mapping application of a client device may access maps based on tiles that are stored on several different tile servers. One challenge is selecting an appropriate tile server to use to generate a requested map, as the tiles may be stored at multiple different tile servers. In some cases, the mapping application may be used to reduce the latency between a time when the request is provided to the tile server(s) and a time when the tiles are provided to the client device. In some aspects, the mapping application resides at the client device.

As used herein, the terms "tile" or "map tile" encompass their plain and ordinary meaning. A tile may store a portion of a map at a given zoom level as an image taking up a predefined area measured in pixels (e.g., 256 pixels by 256 pixels). In one example, a first tile includes a map of the United States showing only major cities and major interstate highways. A second tile includes a map of California showing large and mid-sized cities with interstate and major state highways. A third tile includes a map of San Francisco showing its largest streets. A fourth tile includes a map of the Marina neighborhood of San Francisco and shows all of the streets, parks, and major landmarks in that neighborhood. Additional tiles may be used to overlay the map of the Marina neighborhood (or other maps) with topography, business names and geographic locations, real estate prices, and the like.

Figure 1:
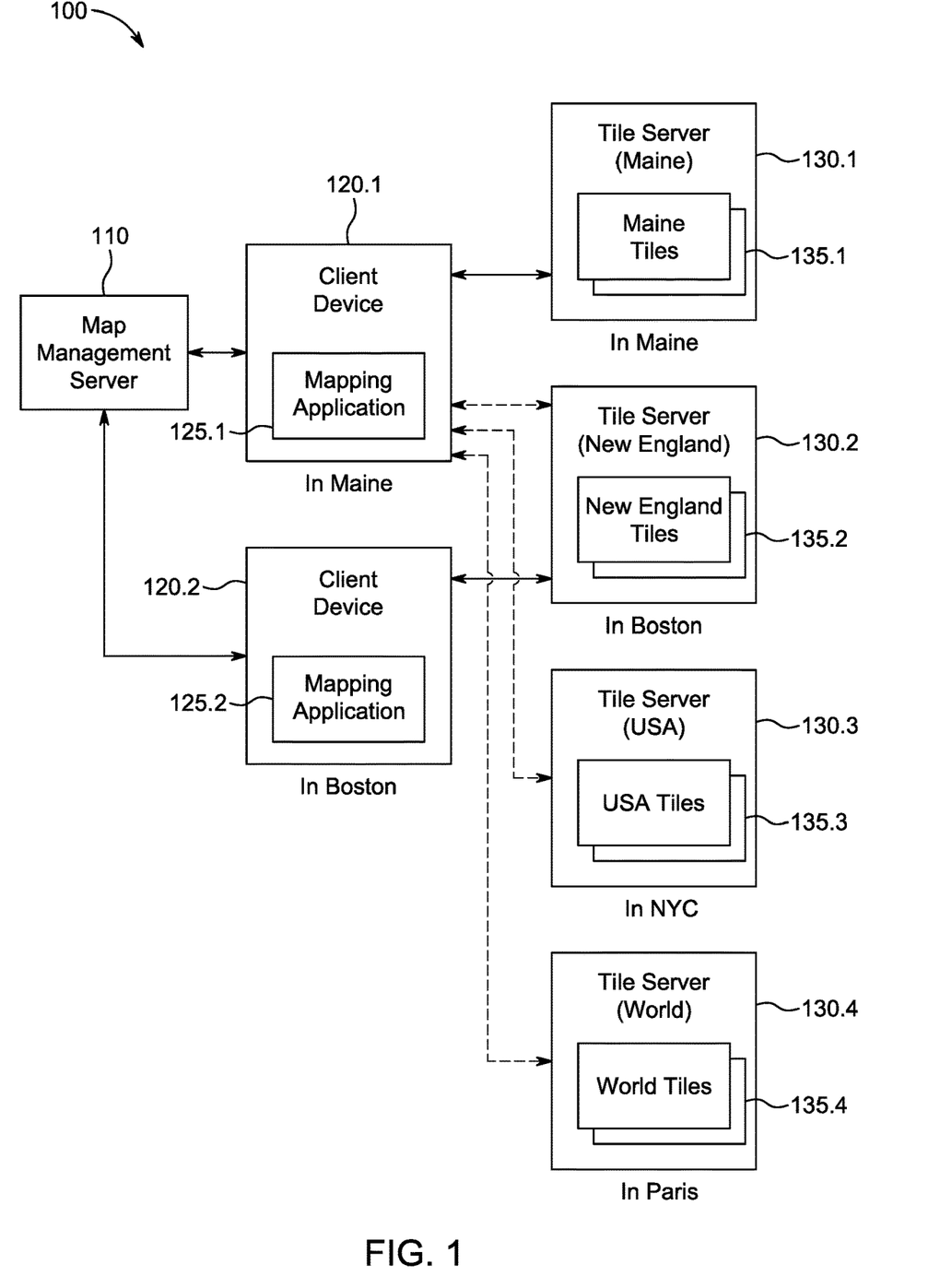
FIG. 1 is a block diagram of an example system in which mapping content is delivered, according to some embodiments.

FIG. 1 is a block diagram of an example system 100 in which mapping content is delivered. As shown, the system 100 includes a map management server 110, a client device 120.1 geographically located in Maine, a client device 120.2 geographically located in Boston, Mass., a tile server 130.1 for Maine geographically located in Maine, a tile server 130.2 for New England geographically located in Boston, a tile server 130.3 for the United States of America (USA) geographically located in New York City (NYC), and a tile server 130.4 for the world geographically located in Paris, France.

Each client device 120.*a* (where a is a number between 1 and 2) includes a mapping application 125.*a*. The mapping application 125.*a* is configured to receive a request for a map of a geographic region, determine (e.g., by consulting the map management server 110, as discussed below) which tiles are required to generate a map of a geographic region, and to display the map of the geographic region. More details of the operation of the mapping application 125.*a* are provided in conjunction with FIGS. 2A-2B.

The Maine tile server 130.1 includes tiles 135.1 for Maine. The New England tile server 130.2 includes tiles 135.2 for New England. The USA tile server 130.3 includes tiles 135.3 for the USA. The world tile server 130.4 includes tiles 135.4 for the world. In FIG. 1, aspects of the subject technology are illustrated in conjunction with one map management server 110, two client devices 120, and four tile servers 130. However, the subject technology may be implemented with any number of map management server(s) 110, client devices 120, or tile servers 130. The tiles 135.*b* (where b is a number between 1 and 4) of the tile servers 130.*b* may be stored at a predetermined zoom level or at multiple different zoom levels. In one example embodiment, the world tiles 135.4 include the USA tiles 135.3 and other tiles. The USA tiles 135.3 include the New England tiles 135.2 and other tiles. The New England tiles 135.2 include the Maine tiles 135.1 and other tiles. (New England includes the states of Maine, New Hampshire, Vermont, Massachusetts, Rhode Island, and Connecticut.) Thus, the world tile server 130.4 occupies more memory than the USA tile server 130.3, which occupies more memory than the New England tile server 130.2, which occupies more memory than the Maine tile server 130.1. As set forth above, in some aspects, each tile server 130.1-4 stores geographic information (e.g., tiles) for a different geographic area.

The map management server 110 is configured to receive, from a client device 120.*a*, a request for a map of a geographic region. The map management server 110 is configured to provide to the client device 120.*a*, in response to the request for the map, an identification of tiles for the map.

Each tile server 130.*b* is configured to receive, from a client device 120.*a*, a request for tiles for a map. In response to this request, the tile server 130.*b* confirms, to the client device 120.*a*, whether the tile server 130.*b* is capable of providing the tiles. If the tile server 130.*b* is capable of providing the tiles, the tile server 130.*b* provides the tiles to the client device 120.*a*.

According to some example embodiments, the client device 120.1 in Maine, while executing the mapping application 125.1, requests a map of a part of Maine from the map management server 110. The map management server 110 notifies the client device 120.1 of the tiles that the client device 120.1 would need for the requested map (e.g., road tiles) and, in some cases, provides some other data (e.g., objects on the map). The client device 120.1 sends the request for the tiles to the Maine tile server 130.1. If the Maine tile server 130.1 successfully returns the requested tiles to the client device 120.1, the client device 120.1 displays the map of the part of Maine based on the tiles. If the Maine tile server 130.1 fails to return the requested tiles, the client device 120.1 provides the request for tiles to the other tile servers 130.2-4. The client device 120.1 receives from the New England tile server 130.2 (or, alternatively, one of the other tile servers 130.3-4) an indication that the New England tile server 130.2 is capable of providing the requested tiles. The client device 120.1 cancels, in response to the indication from the New England tile server 130.2, the request for the tiles from each other tile server 130.3-4. The client device 120.1 receives the tiles from the New England tile server 130.2. The client device 120.1 displays the map of the part of Maine based on the tiles.

In the example embodiments described above, there is a "waterfall" so if the first tile server (e.g., the closest tile server or the Maine tile server 130.1) does not have the tiles, the client device 120.1 sends the request to the other tile servers 130.2-4. Once the client device 120.1 receives a confirmation that one of the other tile servers 130.2-4 is capable of handling the request, the outstanding requests are cancelled.

According to some aspects, each tile server 130.*b* includes a manual cache and a least recently used (LRU) cache. The manual cache includes tiles for maps that are likely to be commonly requested, for example, road maps for major highways and large cities. For example, the Maine tile server 130.1 may include, in its manual cache, road tiles for the interstate highways (e.g., I-95 and I-295) in Maine and road tiles for the largest cities (e.g., Portland, Lewiston, and Bangor) in Maine. The LRU cache is based on recent requests. The LRU cache builds up a store of quickly accessible relevant tiles that can be overwritten. For example, if a festival occurs in Augusta, Me., and maps of Augusta are requested frequently from the Maine tile server 130.1, tiles representing Augusta may be stored in the LRU cache of the Maine tile server 130.1.

According to some examples, the client device 120.1 in Maine is accessing a satellite imagery map of Saco, Me. A user of the client device 120.1 (located in Maine) is collaboratively working on the map with a user of the client device 120.2 (located in Boston). The user of the client device 120.1 decides to change the base layer tiles from satellite imagery to roads. The client device 120.1 makes that change by pulling the road tiles for Saco from the Maine tile server 130.1. The change is pushed to the map management server 110. The user of the client device 120.2, which is located in Boston, opens the collaborative map. The client device 120.2 requests the map from the map management server 110, but gets the tiles from the New England tile server 130.2 instead of the Maine tile server 130.1 (as the New England tile server is located in Boston, which is more quickly accessible to the Boston client device 130.2 than the Maine tile server 130.1). The map management server 110 informs the Boston client device 130.2 to "pull road tiles," but does not specify whether the road tiles are to be pulled from the Maine tile server 130.1, the New England tile server 130.2, or another tile server.

The geographic locations provided in this document are examples and are not intended to limit the subject technology. The subject technology may be implemented with client devices and servers located in any geographic location(s), not necessarily those specified herein. Some aspects of the subject technology may be implemented on virtual machine(s) that lack geographic location(s).

Figure 2A:
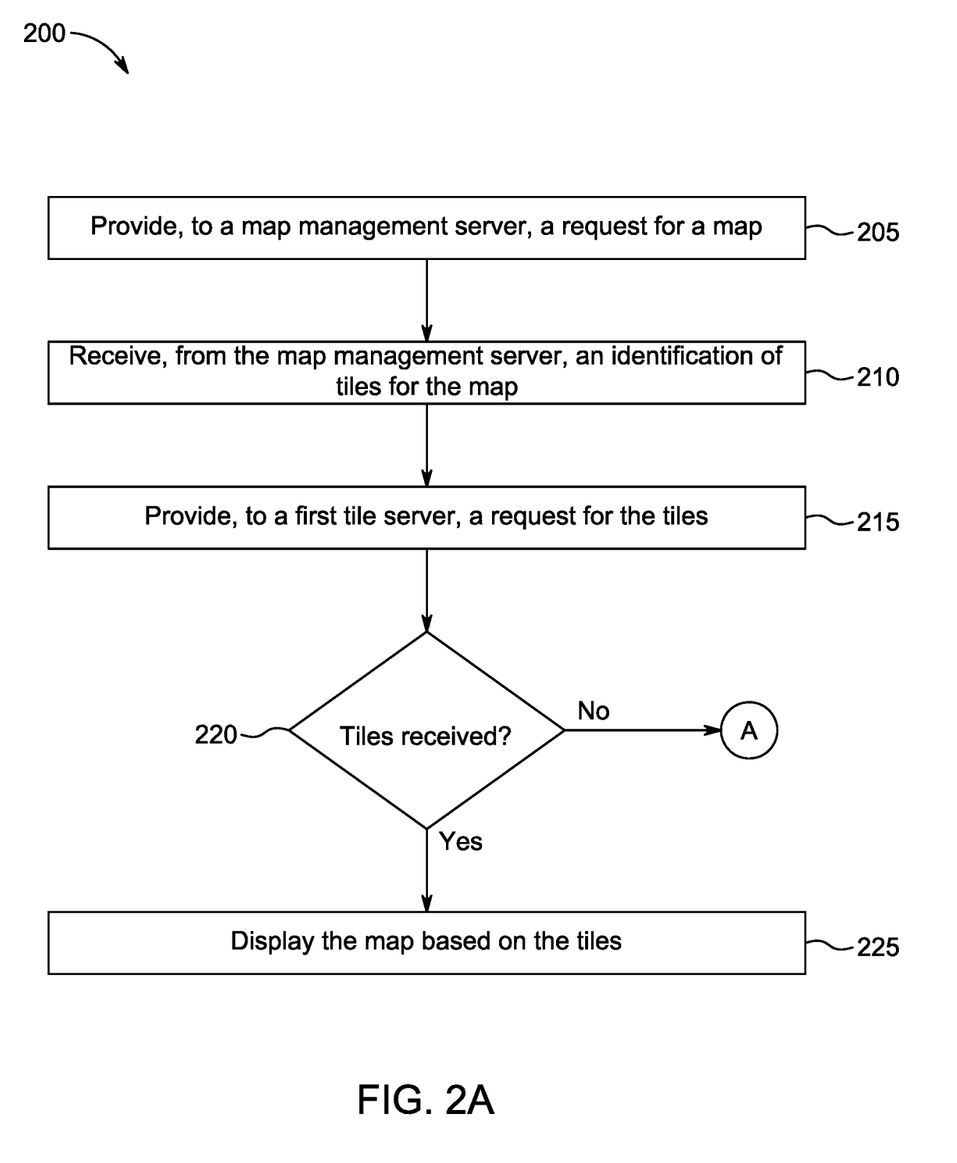
FIGS. 2A-2B is a flow chart illustrating an example method for displaying a map at a client device, according to some embodiments.
Figure 2B:
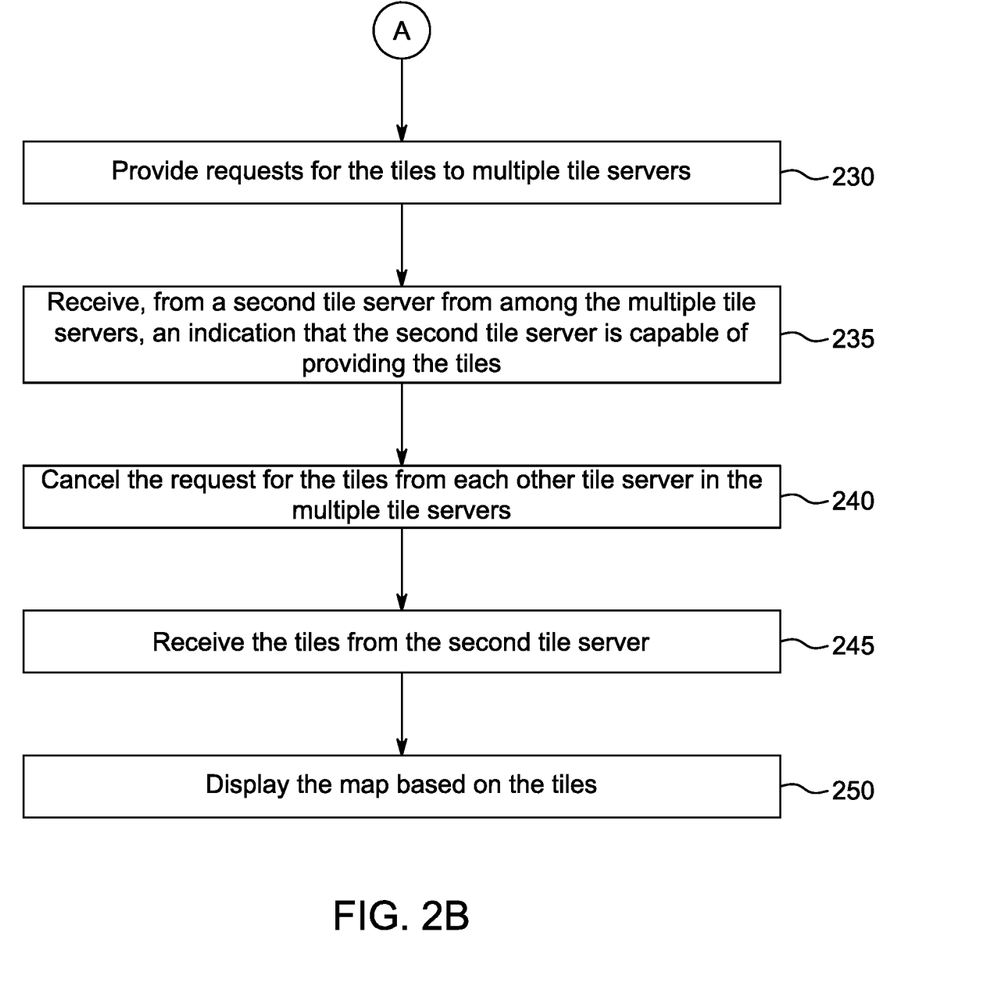

FIGS. 2A-2B are a flow chart illustrating an example method for displaying a map at the client device 120.1 executing the mapping application 125.1. The method 200 may be implemented at the client device 120.1 within the system 100, and is described herein as being implemented at the client device 120.1. However, in alternative embodiments, the method 200 may be implemented at other machine(s) or within other system(s). The method 200 is not limited to being implemented at the client device 120.1 as described herein.

As shown in FIG. 2A, at operation 205, the client device 120.1 provides, to the map management server 110 and from the client device 120.1, a request for a map of a geographic region.

At operation 210, the client device 120.1 receives, from the map management server 110 in response to the request for the map, an identification of tiles for the map.

At operation 215, the client device 120.1 provides, to a first tile server 130.1 and from the client device 120.1, a request for the tiles for the map.

At operation 220, the client device 120.1 determines whether the client device 120.1 receives, from the first tile server 130.1, the tiles in response to the request for the tiles. The client device 120.1 may determine that it has not received the tiles upon receiving a failure message from the first tile server 130.1 or upon failing to receive a response from the first tile server during a threshold time period (e.g., 1 second, 2 seconds, 10 seconds, etc.) after providing the request to the first tile server. If the tiles are received, the method 200 continues to operation 225. If the tiles are not received, the method 200 continues to operation 230 of FIG. 2B.

At operation 225, in response to receiving the tiles from the first tile server 130.1, the client device 120.1 provides for display of the map of the geographic region based on the tiles. After operation 225, the method 200 ends.

As shown in FIG. 2B, at operation 230, in response to failing to receive the tiles from the first tile server 130.1, the client device 120.1 provides multiple new requests for the tiles. Each of the new requests is directed to one of multiple tile servers 130.2-4.

At operation 235, the client device 120.1 receives, from a second tile server 130.2 from among the multiple tile servers 130.2-4, an indication that the second tile server 130.2 is capable of providing the tiles for the map.

At operation 240, the client device 120.1 cancels, in response to the indication from the second tile server 130.2, the request for the tiles from each other tile server 130.3-4 in the multiple tile servers 130.2-4.

At operation 245, the client device 120.1 receives the tiles from the second tile server 130.2.

At operation 250, the client device 120.1 provides for display of the map of the geographic region based on the tiles.

According to some embodiments, the first tile server is selected from a set of servers including the first tile server and the multiple tile servers. The first tile server is selected based on a geographic distance between the client device and the first tile server being less than a geographic distance between the client device and each other tile server in the set.

Figure 3:
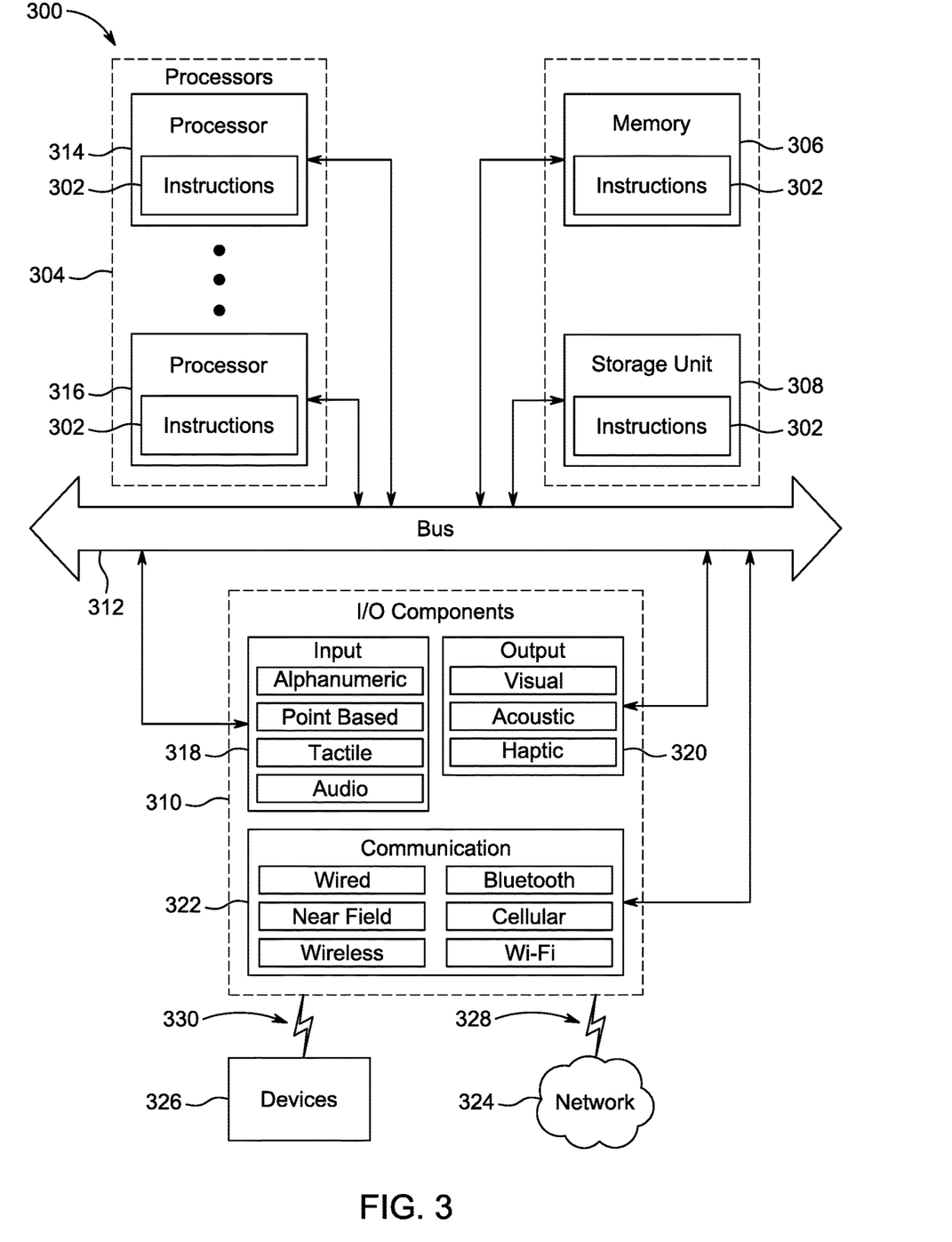
FIG. 3 is a block diagram illustrating components of a machine able to read instructions from a machine-readable medium, according to some embodiments.

FIG. 3 is a block diagram illustrating components of a machine 300, according to some example embodiments, able to read instructions from a machine-readable medium (e.g., a machine-readable storage medium) and perform any one or more of the methodologies discussed herein. The machine 300 may correspond to one or more of the map management server 110, the client device(s) 120.1-2, or the tile server(s) 130.1-4. Specifically, FIG. 3 shows a diagrammatic representation of the machine 300 in the example form of a system, within which instructions 302 (e.g., software, a program, an application, an applet, an app, a driver, or other executable code) for causing the machine 300 to perform any one or more of the methodologies discussed herein may be executed. For example, the instructions 302 include executable code that causes the machine 300 to execute the method 200. In this way, these instructions transform the general, non-programmed machine into a particular machine programmed to carry out the described and illustrated functions in the manner described herein. The machine 300 may operate as a standalone device or may be coupled (e.g., networked) to other machines.

By way of non-limiting example, the machine 300 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 302, sequentially or otherwise, that specify actions to be taken by machine 300. Further, while only a single machine 300 is illustrated, the term "machine" shall also be taken to include a collection of machines 300 that individually or jointly execute the instructions 302 to perform any one or more of the methodologies discussed herein.

The machine 300 may include processors 304, memory 306, storage unit 308 and I/O components 310, which may be configured to communicate with each other such as via a bus 312. In an example embodiment, the processors 304 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 314 and processor 316 that may execute instructions 302. The term "processor" is intended to include multi-core processors that may comprise two or more independent processors (sometimes referred to as "cores") that may execute instructions contemporaneously. Although FIG. 3 shows multiple processors, the machine 300 may include a single processor with a single core, a single processor with multiple cores (e.g., a multi-core process), multiple processors with a single core, multiple processors with multiples cores, or any combination thereof.

The memory 306 (e.g., a main memory or other memory storage) and the storage unit 308 are both accessible to the processors 304 such as via the bus 312. The memory 306 and the storage unit 308 store the instructions 302 embodying any one or more of the methodologies or functions described herein. The instructions 302 may also reside, completely or partially, within the memory 306, within the storage unit 308, within at least one of the processors 304 (e.g., within the processor's cache memory), or any suitable combination thereof, during execution thereof by the machine 300. Accordingly, the memory 306, the storage unit 308, and the memory of processors 304 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 302. The term "machine-readable medium" shall also be taken to include any medium, or combination of multiple media, that is capable of storing instructions (e.g., instructions 302) for execution by a machine (e.g., machine 300), such that the instructions, when executed by one or more processors of the machine 300 (e.g., processors 304), cause the machine 300 to perform any one or more of the methodologies described herein (e.g., methods 200 and 300). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 310 may include a wide variety of components to receive input, provide output, produce output, transmit information, exchange information, capture measurements, and so on. The specific I/O components 310 that are included in a particular machine will depend on the type of machine. For example, portable machines such as mobile phones will likely include a touch input device or other such input mechanisms, while a headless server machine will likely not include such a touch input device. It will be appreciated that the I/O components 310 may include many other components that are not specifically shown in FIG. 3. The I/O components 310 are grouped according to functionality merely for simplifying the following discussion and the grouping is in no way limiting. In various example embodiments, the I/O components 310 may include input components 318 and output components 320. The input components 318 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 320 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 310 may include communication components 322 operable to couple the machine 300 to a network 324 or devices 326 via coupling 328 and coupling 330, respectively. For example, the communication components 322 may include a network interface component or other suitable device to interface with the network 324. In further examples, communication components 322 may include wired communication components, wireless communication components, cellular communication components, near field communication (NFC) components, Bluetooth® components (e.g., Bluetooth® Low Energy), WiFi® components, and other communication components to provide communication via other modalities. The devices 326 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method implemented at a client device, the method comprising:
   providing, to a map management server and from the client device, a request for a map of a geographic region;
   receiving, from the map management server in response to the request for the map, an identification of tiles for the map;
   providing, to a first tile server and from the client device, a request for the tiles for the map;
   in response to failing to receive the tiles from the first tile server:
      providing a plurality of requests for the tiles for the map, each request from the plurality of requests being directed to one of a plurality of tile servers, each request from the plurality of requests being transmitted from the client device, each request from the plurality of requests identifying tiles for the map that have been previously identified by the map management server;
      receiving the tiles for the map from a second tile server from among the plurality of tile servers; and
      providing for display, at the client device, of the map of the geographic region based on the tiles.

2. The method of claim 1, wherein failing to receive the tiles from the first tile server comprises receiving a failure message from the first tile server.

3. The method of claim 1, wherein failing to receive the tiles from the first tile server comprises failing to receive a response to the request to the first tile server during a threshold time period after providing the request to the first tile server.

4. The method of claim 1, further comprising:
   selecting the first tile server from a set of tile servers based on a geographic distance between the client device and the first tile server being less than a geographic distance between the client device and each other tile server from among the set of tile servers.

5. The method of claim 4, wherein the set of tile servers comprises the first tile server and the plurality of tile servers.

6. The method of claim 1, wherein each tile from among the tiles tile stores a portion of the map at a given zoom level as an image taking up a predefined area measured in pixels.

7. The method of claim 1, wherein each of the plurality of tile servers stores geographic information for a different geographic area.

8. The method of claim 1, further comprising:
in response to failing to receive the tiles from the first tile server:
receiving, from the second tile server from among the plurality of tile servers, an indication that the second tile server is capable of providing the tiles for the map; and
cancelling, in response to the indication from the second tile server, the request for the tiles from each other tile server in the plurality of tile servers.

9. The method of claim 1, wherein each of the tile servers comprises:
a least recently used (LRU) cache storing recently requested tiles; and
a manual cache storing a predetermined set of tiles.

10. The method of claim 1, wherein the predetermined set of tiles stored in the manual cache comprises road tiles associated with major highways in a geographic region associated with the tile server and road tiles associated with a set of largest cities in a geographic region associated with the tile server.

11. The method of claim 1, further comprising:
in response to failing to receive the tiles from the first tile server:
receiving, from the second tile server, in addition to the tiles for the map, one or more objects for display on the map, wherein the one or more objects are associated with the geographic region.

12. A non-transitory machine-readable medium storing instructions which, when executed by one or more machines, cause the one or more machines to perform operations comprising:
providing, to a map management server and from a client device, a request for a map of a geographic region;
receiving, from the map management server in response to the request for the map, an identification of tiles for the map;
providing, to a first tile server and from the client device, a request for the tiles for the map;
in response to failing to receive the tiles from the first tile server:
providing a plurality of requests for the tiles for the map, each request from the plurality of requests being directed to one of a plurality of tile servers, each request from the plurality of requests being transmitted from the client device, each request from the plurality of requests identifying tiles for the map that have been previously identified by the map management server;
receiving the tiles for the map from a second tile server from among the plurality of tile servers; and
providing for display, at the client device, of the map of the geographic region based on the tiles.

13. The machine-readable medium of claim 12, wherein failing to receive the tiles from the first tile server comprises receiving a failure message from the first tile server.

14. The machine-readable medium of claim 12, wherein failing to receive the tiles from the first tile server comprises failing to receive a response to the request to the first tile server during a threshold time period after providing the request to the first tile server.

15. The machine-readable medium of claim 12, the operations further comprising:
selecting the first tile server from a set of tile servers based on a geographic distance between the client device and the first tile server being less than a geographic distance between the client device and each other tile server from among the set of tile servers.

16. The machine-readable medium of claim 15, wherein the set of tile servers comprises the first tile server and the plurality of tile servers.

17. A system comprising:
processing circuitry; and
a memory storing instructions which, when executed by the processing circuitry, cause the processing circuitry to perform operations comprising:
providing, to a map management server and from a client device, a request for a map of a geographic region;
receiving, from the map management server in response to the request for the map, an identification of tiles for the map;
providing, to a first tile server and from the client device, a request for the tiles for the map;
in response to failing to receive the tiles from the first tile server:
providing a plurality of requests for the tiles for the map, each request from the plurality of requests being directed to one of a plurality of tile servers, each request from the plurality of requests being transmitted from the client device, each request from the plurality of requests identifying tiles for the map that have been previously identified by the map management server;
receiving the tiles for the map from a second tile server from among the plurality of tile servers; and
providing for display, at the client device, of the map of the geographic region based on the tiles.

18. The system of claim 17, wherein failing to receive the tiles from the first tile server comprises receiving a failure message from the first tile server.

19. The system of claim 17, wherein failing to receive the tiles from the first tile server comprises failing to receive a response to the request to the first tile server during a threshold time period after providing the request to the first tile server.

20. The system of claim 17, the operations further comprising:
selecting the first tile server from a set of tile servers based on a geographic distance between the client device and the first tile server being less than a geographic distance between the client device and each other tile server from among the set of tile servers.

* * * * *